May 23, 1944.  A. F. PYM  2,349,374
MANUFACTURE OF SHOES AND SHOE PARTS
Filed Feb. 19, 1942  2 Sheets-Sheet 1
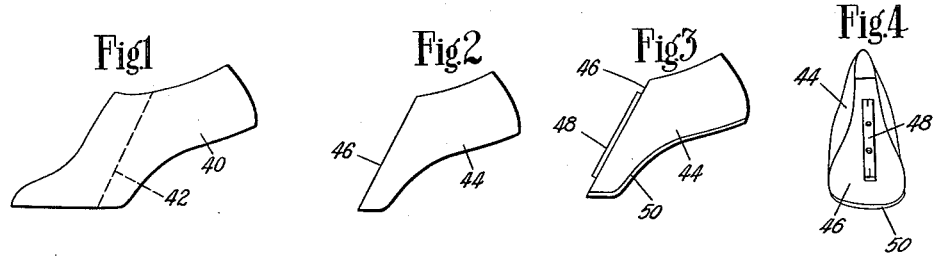
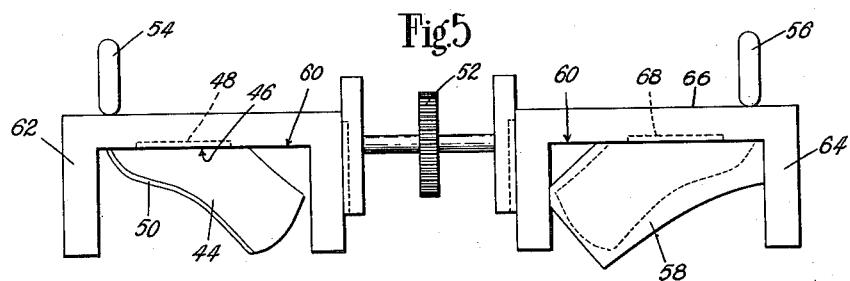
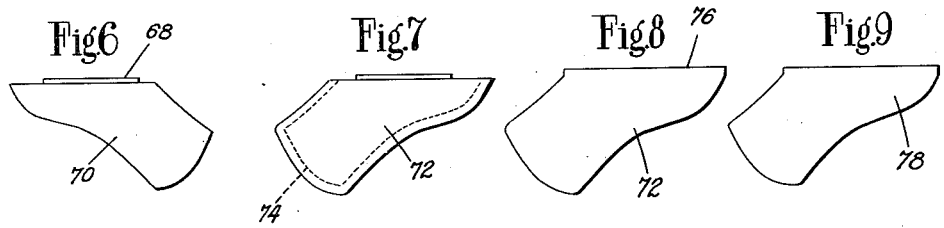
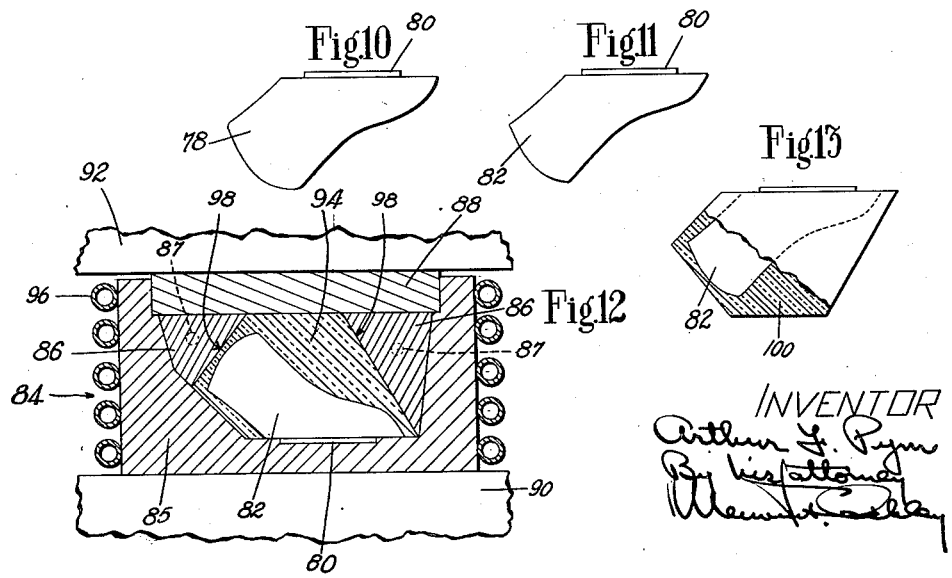
INVENTOR
Arthur F. Pym May 23, 1944. A. F. PYM 2,349,374
MANUFACTURE OF SHOES AND SHOE PARTS
Filed Feb. 19, 1942 2 Sheets-Sheet 2

INVENTOR
Arthur F. Pym
By his attorney

Patented May 23, 1944

2,349,374

UNITED STATES PATENT OFFICE 2,349,374

MANUFACTURE OF SHOES AND SHOE PARTS

Arthur F. Pym, Swampscott, Mass., assignor to United Shoe Machinery Corporation, Flemington, N. J., a corporation of New Jersey Application February 19, 1942, Serial No. 431,547

12 Claims. (Cl. 12—142)

This invention relates to the manufacture of shoes and shoe parts which are composed, at least in part, of plastic or moldable material and one object of the invention is to provide for the production of such articles without undue expense and in a manner which will insure uniformity and accuracy in quantity production. The invention is herein disclosed with particular reference to its application to the manufacture of back part units for shoes, the illustrated part or unit comprising heel, shank and upper portions and being adapted to constitute the entire structure, or a substantial part of the entire structure, of a shoe in the locality rearward of the ball portion. The term "back part" or back part unit is intended to comprehend a part which is substantially coextensive with the heel portion only of a shoe as well as one which extends also into or throughout the entire length of the shank portion of the shoe.

The invention is particularly useful in the manufacture of women's shoes of the high heel type wherein the shank has a pronounced back curvature and in such cases my improved back part unit comprises, as herein shown, a heel portion of the shape of a conventional high Louis heel, a shank portion which extends forwardly and downwardly from the upper breast portion of the heel and is curved to correspond to that of the bottom of the foot, and an upper portion in the form of a flange rising from the rear and lateral margins of the upper surface of the heel portion and from the lateral margins of the shank portion, the flange-like upper portion being shaped to fit the rear and sides of the foot. The invention includes also within its scope novel back parts and novel shoes produced by carrying out my improved method.

The invention involves molding the plastic material around an inside form or mold which may be developed from the last to be employed in making the shoe in which the unit is to be incorporated and which is shaped to determine the final contour of those surfaces of the finished unit or back part which are to face the foot, i. e., the interior surface of the flange-like upper portion and the upper surfaces of the heel and shank portions of the unit. These surfaces of the unit will be referred to hereinafter as inside or interior surfaces while the other surfaces of the unit will be termed outside or exterior surfaces. The molding operation, as illustrated, is carried out with the aid of an outside mold or flask which cooperates with the inside form in molding a blank having surface portions shaped to final contour (by the inside mold) to constitute the interior surfaces of the unit and having other surface portions (formed by the outer mold) which are to be reshaped by subsequent cutting or reducing operations to constitute the exterior surfaces of the unit. While the blank, thus molded, has interior surfaces of a finally desired contour, it is nevertheless an unfinished product having excess or surplus material to be removed by subsequent operations which are to impart the final external contour thereto. In the blank herein shown the heel and shank portions comprise a solid block of material having no surfaces even approximating the contours which are subsequently to be imparted to the blank to define the breast face of the heel portion and the arched lower side of the shank. As illustrated, the cutting operations include a turning operation performed in a lathe whereby the contour imparted to the exterior of the blank is determined by a pattern or model which may also be developed from the last. The turning operation determines substantially the final external contour of the upper or hollow flange-like portion of the unit and also substantially the final curvature of the rear and sides of the heel portion but does not alter the shape of the lower or outer shank portion of the unit, the shape of this portion of the unit and that of the breast of the heel portion being determined by a cutting operation which follows the turning operation and which may be accomplished by the use of a band saw. By means of the band saw the bulk of the solid material in the shank portion of the blank is removed so that the shank arch and the heel breast is roughly shaped. The final contours of these portions of the unit are then produced by manual shaping operations after which the entire surface of the unit may be smoothed or polished.

If the completed unit is to be employed as the entire back part of a shoe, the shoe may be made by merely joining the forward extremity of the plastic back part unit to the rearward extremity of a forepart unit which may be constructed of leather or other appropriate materials in accordance with conventional shoemaking methods. The plastic back part unit may, however, be fabricated with other shoe elements which may include, for example, a full length insole a portion of which is overlaid upon and secured to the upper surfaces of the heel and shank portions of the unit and upper materials which may underlie or overlie the upper or flange-like portion of the unit.

While the above-described method may involve the use of inner molds of a complete run of sizes, it does not involve the use of outer molds of a corresponding run of sizes inasmuch as the final exterior contours of the units are determined by reducing operations in lieu of molding operations. The reducing operations being relatively inexpensive-as compared with molding operations, the units may be produced by my novel method at substantially less expense than if it were necessary to employ outer molds in a complete run of sizes. Moreover, the outer molds are preferably so sized and shaped that a substantial number of finished units may be produced with the use of a single outer mold. This greatly reduces the cost incident to the making of the outer molds and renders my method adaptable to various style changes without involving additional expense.

The invention will now be described with reference to the accompanying drawings, in which Figs. 1 to 11, inclusive, are conventional views illustrative of successive operations performed in making the inside mold or form, as hereinafter described in detail, each figure, except Fig. 4, showing a work piece in side elevation, and Fig. 4 being an end elevational view of the work piece shown in Fig. 3;

Fig. 12 is a sectional view of the inside and outside molds or forms, illustrating the operation of molding a back part blank;

Fig. 13 is a view, partially in side elevation and partially in section, of a back part blank as it appears after it has been removed from the outside mold;

Figure 19:
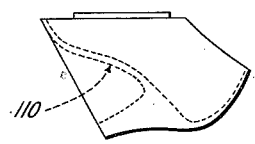
Figure 20:
Figure 21:
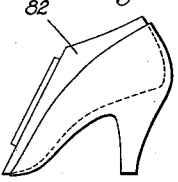
Figure 22:
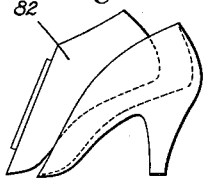
Figure 24:
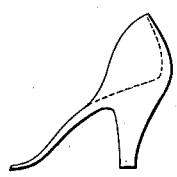
Figure 23:
Figure 25:
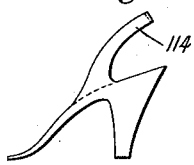
Figure 26:
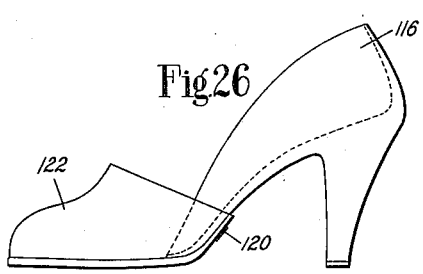
Figure 27:
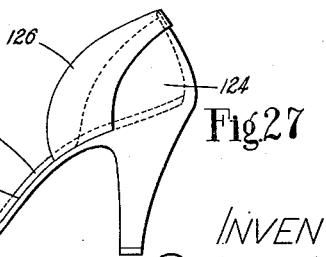
Figure 28:
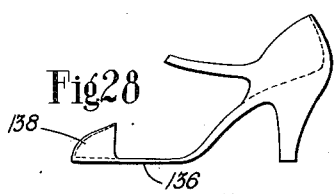

Figs. 14 to 18, inclusive, are conventional side elevational views of work pieces illustrative of successive operations performed in the production of the model used to determine the external contour to be imparted to the back part blank by the turning operation;

Figs. 19 to 21, inclusive, are side elevational views illustrative of successive steps performed upon the back part blank subsequently to the turning operation;

Fig. 22 is a view, in side elevation, of a completed back part blank illustrating the step of removing the inside mold therefrom;

Fig. 23 is a perspective view of the back part;

Figs. 24 and 25 are side elevational views of back parts having upper portions of modified form;

Figs. 26 and 27 are perspective views of completed shoes in which my improved back parts are incorporated; and Fig. 28 is a view, in side elevation, of a plastic unit having a forepart as well as shank and rear portions thereby providing a complete shoe.

As already indicated, my improved method of making back part units consists, in brief, in molding plastic material around an inside form corresponding to the desired shape of the interior or foot-facing surfaces of the unit, thereby producing a blank having internal surfaces which are shaped to final contour by means of the inside form and external surfaces which are not shaped to final form, the external shape of the blank, however, being such that the volume of the unit to be produced is wholly contained therein so that the final external contour of the unit may be imparted by subsequent cutting or reducing operations. Preferably, a thermoplastic synthetic resin is employed as the material from which the units are to be made and, in order that the inside form employed in the making of the units shall be adapted to withstand the heat and pressure incident to the molding of the thermoplastic material, I prefer to construct the inside form of metal. Advantageously, the metallic inside form is cast in a mold the shape of which is determined from an oversize wooden form turned in a lathe from a model developed from a last of the size and shape required for the shoe in which the back part unit is to be incorporated, and then the casting is turned in the lathe to a final shape determined by another form developed from the last. After being molded around the inside form the blank, with the form embedded therein, is placed in the lathe and turned, under the control of another model, also developed from the last, to impart the desired final external contour to the upper or flange portion of the unit. Thereafter, by other cutting or reducing operations, not performed by the lathe, the final contours of the heel and the bottom of the shank portion of the unit are obtained. In the lathe it is necessary that both the work and the model be very accurately located inasmuch as accurate coordination is required between the inside form and the model which determines the exterior contour of the unit. Accordingly, I employ suitable jigs for holding both the work and the model in the lathe and I provide suitable holding plates on the models and on the work for securing them to the jigs, as will be hereinafter explained.

Referring now to the drawings, I have illustrated in Figs. 1 to 11, inclusive, a method which may advantageously be practiced in making the inside form or mold. Starting with a block last 40 of the same size and shape as the last upon which the shoe is to be made, I remove the forepart of the last by cutting it along the dotted line 42 thereby producing the last back part 44 shown in Fig. 2. This results in forming upon the last part 44 a plane face 46 which is disposed at an angle of substantially 45° to the bottom of the heel end of the part and which serves to position the last part in the lathe as shown in Fig. 5 in the relation to the turning axis which has been found best adapted to control the action of the cutter in shaping the work. I then secure to the face 46 of the last part 44 a holding plate 48 (Figs. 3 and 4). If the back part unit when completed is to constitute the entire back part of the shoe, the last part 44 is now ready to be used as a model in the lathe. If, however, the shoe is to be provided with an insole which is to overlie the shank portion of the back part, an allowance is made for the thickness of the insole by building up the bottom of the last part 44 a corresponding amount, as by securing thereto a piece of sheet material 50 of the required thickness. It may be also that an upper, or an upper lining, is to be positioned over the upper flange of the back part in the finished shoe. In such a case the interior of the back part is made large enough to allow for the thickness of the upper or upper lining by the simple expedient of grading up from the model in the turning operation but in that case it is necessary, in adding the sheet material 50 to the bottom of the last part 44, to use material of a thickness equal to that of the insole of the shoe minus the thickness of the upper material since in the grading operation an allowance is made for the latter thickness at the bottom as well as at the sides of the back part.

A lathe suitable for use in performing various steps of my method is that disclosed in United States Letters Patent No. 2,072,228, granted March 2, 1937, upon application of Laurence E. Topham et al. Such a lathe is illustrated conventionally in Fig. 5 wherein a portion of the operating mechanism is indicated at 52, the model wheel or roll at 54 and the cutting tool at 56. In this figure, also, the last part 44 is shown in position to function as a model for cooperating with the roll 54 in controlling the action of the cutter 56 upon the work 58. As shown, the last part 44 is positioned by the engagement of its face with the horizontal surface 60 of a jig 62 by means of which the last part is mounted in the lathe, the last part being secured to the jig by means of the holding plate 48. A jig 64 corresponding to the jig 62 is employed for holding the work piece 58. The work piece 58 is a block of wood having a plane face 66 which is secured by a holding plate 68 to the jig 64.

As the result of the turning operation in the lathe the wooden work piece 58 is turned down to a contour corresponding to that of the last part 44 plus the bottom thickness of the sheet material 50 and plus also the all-over thickness added by the grading operation to allow for that of the upper material, thereby producing the form shown at 70 in Fig. 6. The form 70 is in turn used as a model in turning a pattern 72 (Fig. 7) from which the metallic inside mold is to be cast. In turning the pattern 72 a model wheel of a suitable size is employed to provide for the "grading up" operation thereby to make the pattern uniformly larger than the model, the size of the model being indicated in Fig. 7 by the dotted lines 74. Thereafter the bottom portion of the pattern 72 is built up as indicated at 76 in Fig. 8 and from this pattern an aluminum casting 78 (Fig. 9) is made which, like the pattern, is oversized to allow for shrinking of the metal. The built-up portion 76 of the casting 78 is partially cut away to form a holding plate 80, as shown in Fig. 10, whereupon the casting is placed in the lathe and turned down to final shape as accurately determined by the use of the model 70 (Fig. 6). The casting thus reduced to the desired shape and size as shown at 82 in Fig. 11, constitutes the inside form or mold which is to be used in the molding of the plastic back part blank.

The inside form or mold 82 is used in cooperation with an outside mold 84, the interior of which is shaped approximately as indicated in Fig. 12 thereby adapting it to impart a rough or blank surface conformation to the exterior of the plastic blank. As shown, the outside mold 84 comprises a body portion or flask 85 having shaping members or inserts 86 removably held in place by means of dowels 87 and having an opening between the members 86 adapted to be closed by a removable cover plate 88. The bottom of the flask 85 is recessed to receive the holding plate 80 on the inside mold 82 so that the inside mold may be properly positioned relatively to the outside mold by engagement of the surface which carries the holding plate with the bottom of the flask 85. The outside mold is shown as being positioned upon the bed or table 90 of a press and a pressure-applying member 92 is shown as acting upon the cover plate 88 to apply pressure to a mass of plastic material 94 within the flask 85. Inasmuch as it is preferred to employ thermoplastic material in making the back part unit, it is desirable to heat the material and for this purpose a heating coil 96 is shown as encircling the flask 85.

Various thermoplastic synthetic resins may be employed as the material from which the blank is to be molded. A suitable material for this purpose is cellulose acetate. Other suitable materials are polyvinyl acetal, methyl methacrylate and monomeric methyl acrylates such as butyl, amyl, stearyl, interpolymerized with methacrylate ester, vinyl compounds, etc. Advantageously, the materials may be introduced into the flask 85 in powdered form. After the plastic material has been reacted by heat and pressure and permitted to cool and harden, the cover plate 88 and the inserts 86 are removed from the flask 85 and the solid mass of molded plastic material, with the inside mold 82 embedded therein, is withdrawn from the flask. The plastic material, with the embedded mold 82, now appears as shown in Fig. 13, wherein the molded plastic blank is indicated at 100. The interior of the blank 100 comprising the surfaces thereof which were formed by the inside mold 82 is of final shape, but the roughly formed exterior of the blank is to be shaped to final form by subsequent reducing operations, the blank being of such a size and shape that the desired exterior contour is wholly contained within the blank.

Figure 14:
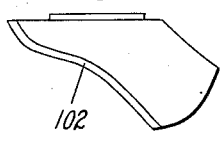
Figure 15:
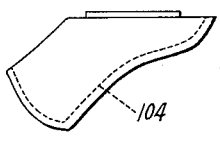
Figure 16:
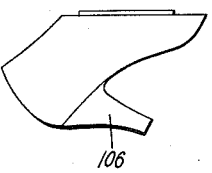
Figure 17:
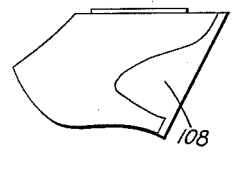
Figure 18:
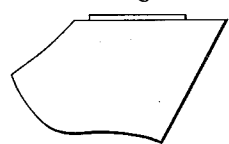

The next step in the reducing of the blank 100 is accomplished by a turning operation in the lathe and, in order to determine the contour to be imparted to the blank by the turning operation, another model is made. The method of making this model is illustrated in Figs. 14 to 18, inclusive. Starting with the model 70 shown in Fig. 6, an allowance is made for the thickness of the plastic material in the shank portion of the back part unit by applying to the bottom of the model 70 a piece of sheet material 102 (Fig. 14) equal to the thickness of the shank portion of the back part. Using the form thus produced as a model in the lathe a block of wood is turned to the shape shown in Fig. 15, an amount of stock corresponding to the thickness desired in the plastic material having been added by the process of grading up in the turning operation, the amount of material thus added being indicated at the outer side of the dotted line 104 in Fig. 15. The wooden form produced by this turning operation is then built up by attaching thereto a wooden heel 106 as indicated in Fig. 16, and inasmuch as the model wheel and the cutter of the lathe cannot enter into the hollow forwardly of the heel 106 this hollow portion is filled in by means of a filler piece 108 as indicated in Fig. 17. After having been suitably smoothed and finished, the form thus produced appears as shown in Fig. 18 and is used as a model in turning the plastic blank shown in Fig. 13 to the exterior form as shown in Fig. 19.

The plastic blank is then removed from the lathe and the next operation consists in shaping the shank and heel breast portions of the blank. This may be accomplished, for example, by the use of a band saw, cutting through the solid material in the shank portion of the blank along the dotted line 110 (Fig. 19), thereby shaping the bottom of the blank as shown in Fig. 20. Next, the upper portion of the blank which surrounds the inside form (which is still embedded therein) is trimmed along the dotted line 112 in Fig. 20, thereby determining the edge contour of the flange-like upper portion of the back part, as indicated in Fig. 21. The inside mold 82 may now be removed from the plastic material, as indicated in Fig. 22, leaving the plastic material in completed form except for smoothing and polishing operations which may be performed thereon if desired. However, the portions of the exterior surface of the unit which is produced by the turning operation in the lathe is so nearly smooth that no substantial amount of finishing of these portions is necessary. It is to be noted that the chips of the plastic material removed from the blank in the reducing operations are reclaimable and can be remelted and utilized in subsequent molding operations.

The back part unit may be made of the general shape shown in elevation in Fig. 22 and in perspective in Fig. 23. Obviously, however, various modifications may be made in the shape of the unit and particularly with respect to the marginal contour of the upper or flange portion thereof. For example, the flange portion of the unit may be trimmed to the edge contour shown in Fig. 24 wherein the flange is confined to the heel portion of the unit, thus adapting the unit for use in a shoe of the open-shank or sandal type. Another variation is that illustrated in Fig. 25 wherein a back part unit is shown adapted for use in a shoe of the open-heel as well as of the open-shank type, the rear and sides of the flange portion having been cut away so as to leave merely a heel strap 114 extending upwardly from the shank portion of the unit. The flange portion of the unit may be trimmed in various other ways to produce heel and/or ankle strap forms of various styles and shapes.

A plastic back part unit, such as that shown in Fig. 23, may be employed as the entire back part of a shoe, as indicated at 116 in Fig. 26, the forward extremity of the unit being secured in any suitable manner as by means of cement or by the use of one or more rivets 120 to a forepart 122 which may comprise upper and bottom elements composed of leather or other suitable material, the forepart being manufactured by conventional shoemaking methods.

In Fig. 27 I have disclosed a shoe having incorporated therein a plastic back part unit 124 shaped substantially like the unit shown in Fig. 24 to illustrate how the flange-like upper portion of the unit may be used in combination with upper members of leather, fabric, or the like, such as the open-heel quarter 126. As shown, the quarter 126 overlaps the upper flange of the back part 124, leaving the latter, however, partially exposed where the heel opening of the quarter is located. Obviously, the quarter may overlap the back part flange, or the back part flange may overlap the quarter, or the quarter may comprise upper and lining elements disposed respectively at the outer and inner sides of the back part flange. The shoe shown in Fig. 27 comprises also a vamp 128 which together with the quarter 126 may be overlasted upon a full length insole 130. The back part 124 may be applied and secured as by means of cement to the bottom of the lasted shoe and thereafter a forepart tread sole 132 may be cement attached to the shoe, the rear portion of the tread sole underlying and being cemented or otherwise attached at 134 to the forward shank portion of the back part unit.

My invention is applicable also to the manufacture of plastic units of full shoe length adapted to constitute a complete shoe. Such a unit as illustrated in Fig. 28 may comprise, in addition to rear and shank portions which may be shaped like any of the back part units hereinbefore described, a forepart consisting of a tread sole portion 136 formed as an extension of the shank portion of the rear part and a vamp or toe portion 138, the entire unit being of one-piece plastic formation. In making a full length unit or shoe, such as that shown in Fig. 28, substantially the same method may be practiced as that above described in connection with the manufacture of the plastic back part units except that a suitable plasticizer may be employed in that portion of the plastic material which is to form the forepart of the unit to provide for the requisite amount of flexibility in the forepart of the shoe and advantageously the inside form used in molding the blank may be made in two or more sections so disposed as to render the mold collapsible so that it may be readily withdrawn from the molded blank.

Having described my invention, what I claim as new and desire to secure by Letters Patent of the United States is:

1. In the manufacture of shoes, that improvement which consists in molding a one-piece plastic unit having an interior surface shaped to a final contour corresponding to that of the back part of a last or foot and having an over-sized exterior of unfinished formation, thereafter reducing the exterior of said unit to a desired surface contour corresponding to that of the exterior of the back part of a shoe, and securing said unit to a shoe forepart unit to provide a shoe.

2. In the manufacture of back parts for shoes, that improvement which consists in molding a plastic back part blank having inner surface portions shaped to a final contour corresponding to that of the back part of a last and having a surplus of material over that required for the finished product in the remaining portions of the blank, and thereafter by reducing operations shaping the remaining portions of the blank to correspond to the external contour of the back part of a shoe.

3. In the manufacture of shoes, that improvement which consists in molding a one-piece plastic unit having a solid bottom portion and a hollow upper portion and, in the molding operation, shaping to final form the interior of said hollow portion and the upper side of said solid portion, and thereafter reducing said blank by removing material from the remainder of said solid portion thereby forming a shoe shaped exteriorly by said reducing operation and interiorly by said molding operation.

4. In the manufacture of back parts for shoes, that improvement which consists in molding a plastic back part comprising a solid heel and shank portion having an upstanding peripheral flange and in the molding operation shaping the inner side of said flange and the upper surface of said solid portion to final contours corresponding respectively to those of the sides and the bottom of the back part of a last, thereafter reducing said blank by removing material from the remainder of said solid portion thereby forming a back part shaped by said reducing operation to correspond in exterior contour to that of the back part of a shoe and by said molding operation providing an interior contour substantially complemental to that of the back part of a last.

5. In the manufacture of back parts for women's high arched shoes, that improvement which consists in molding a one-piece plastic back part blank comprising a solid heel portion, a solid shank portion having a bottom surface in line with the bottom of said heel portion, and an upstanding flange portion extending along the periphery of the upper surfaces of said heel and shank portions and, in the molding operation, shaping the inner side of said flange portion and the upper surfaces of said heel and said shank portions to a final contour substantially complemental to that of the back part of a last, subsequently reducing the outer side of said flange portion and the rear of said heel portion to desired final contours, removing material from the bottom of said shank portion thereby forming a heel breast face and roughly shaping a highly arched bottom surface in said shank portion, and thereafter shaping said bottom surface to final contour.

6. In the manufacture of back parts for shoes, that improvement which consists in molding plastic material between an inside form shaped to produce a desired surface contour in the foot-facing portions of the back part and an outside form shaped to provide a blank exterior contour thereby providing a back part blank having its foot-facing surfaces only of a finally desired shape, and subsequently reducing the other portions of the blank to final shape.

7. In the manufacture of back parts for shoes, that improvement which consists in molding thermoplastic material with accompanying heat and pressure thereby forming a back part blank having inner surface portions shaped to a final contour corresponding to that of the back part of a last or foot and rough shaping the exterior of the blank, allowing the molded material to cool and harden, and thereafter reducing the exterior of the blank to a contour corresponding to that of the exterior of the back part of a shoe.

8. That improvement in the manufacture of back parts for shoes which consists in molding a one-piece plastic back part blank and, in the molding operation, shaping portions of the blank to a final contour corresponding substantially to that of the sides and rear of the back part of a last and to the bottom of an insole on the last and rough shaping the rest of the blank, and thereafter reducing the rough-shaped portions of the blank to a desired final contour.

9. In the manufacture of back parts for shoes, that improvement which consists in providing an inside form shaped substantially like the back part of a last and an outside form shaped to cooperate with said inside form in molding a back part blank having an inner surface contour determined by said inside form and having its mass so distributed that the final outside contour of the back part can be produced by subsequent reducing operations, molding a blank between said forms, removing said outside form but leaving said inside form embedded within said blank, reducing the blank to final outside contour while said inside form remains embedded therein to provide support for portions of the blank during the reducing operation, and finally removing said inside form.

10. In the manufacture of back parts for shoes, that improvement which consists in providing a form shaped substantially like the back part of a last, molding around said form a one-piece back part blank of plastic material consisting of a solid bottom portion having an upper surface of a finally desired contour determined by said form and a flange-like upper portion having an inner surface of a finally desired contour determined by said form, said flange being thicker and said bottom portion being larger than the respective portions of the back part to be produced from said blank, providing a pattern having a contour in part like the exterior of the back part of a shoe, placing said pattern in a lathe and also placing in the lathe said blank with said form embedded therein and reducing said blank to an exterior contour determined by said pattern while said form serves to support the flange-like portion of said blank against the pressure of the reducing instrumentality, removing said blank and said form from the lathe, shaping to final contour those portions of the blank not already shaped by said form and by said reducing operations thereby producing a substantially completed back part, and separating said back part from said form.

11. In the manufacture of plastic shoes, that improvement which consists in molding plastic material into a one-piece unit having an interior surface shaped to a final contour corresponding to that of a last or foot and having an exterior of blank form, and thereafter reducing the exterior of the unit to a desired surface contour corresponding to that of the exterior of a shoe.

12. In the manufacture of shoes, that improvement which consists in providing a mold shaped to form a blank having a hollow portion interiorly contoured to fit a last or a foot and having an oversized exterior of unfinished formation, introducing into said mold thermoplastic material capable of being acted upon by heat and pressure to form a molded blank, introducing a plasticizing substance together with said thermoplastic material into a selected locality only in said mold, applying heat and pressure the material in said mold thereby producing a blank having a hollow portion the interior of which is shaped to fit a foot or a last and having a portion which is relatively flexible compared to the rest of the blank, removing the blank from the mold, and reducing the exterior of the blank to the form of the exterior of a shoe.

ARTHUR F. PYM.